US008503120B2

(12) United States Patent  
Huang (10) Patent No.: US 8,503,120 B2  
(45) Date of Patent: Aug. 6, 2013

(54) VOICE COIL MOTOR AND CAMERA MODULE HAVING SAME

(75) Inventor: Chien-Feng Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 13/069,394

(22) Filed: Mar. 23, 2011

(65) Prior Publication Data

US 2012/0162793 A1 Jun. 28, 2012

(30) Foreign Application Priority Data

Dec. 23, 2010 (TW) ................................ 99145544 A (51) Int. Cl.
*G02B 7/02* (2006.01)
(52) U.S. Cl.
USPC ............................ 359/824; 359/822; 359/823
(58) Field of Classification Search
USPC .................. 359/694–698, 822–826
See application file for complete search history.

(56) References Cited

U.S. PATENT DOCUMENTS

2011/0205647 A1* 8/2011 Osaka et al. .................. 359/824
2012/0162791 A1* 6/2012 Ku ................................ 359/824

* cited by examiner

*Primary Examiner* — Mahidere Sahle
(74) *Attorney, Agent, or Firm* — Altis Law Group, Inc.

(57) ABSTRACT

A voice coil motor includes a movable barrel and a spring plate. The movable barrel includes a top end and a number of locating members. Each locating member includes a locating post on the top end, and a blocking portion on the locating post. The spring plate includes a top surface, a bottom surface, and an inner frame. The spring plate defines a through hole passing through the top surface and the bottom surface. The inner frame surrounds the through hole. The inner frame defines a number of locating holes. Each locating hole receives a corresponding locating post. The spring plate is positioned between the blocking portions and the top end. The blocking portions lock the inner frame to the movable barrel. The inner surface of each locating hole defines spaced gaps. Each gap passes through the top and the bottom surfaces.

20 Claims, 7 Drawing Sheets

VOICE COIL MOTOR AND CAMERA MODULE HAVING SAME

BACKGROUND

1. Technical Field

The present disclosure relates to motors and, particularly, to a voice coil motor and a camera module having the voice coil motor.

2. Description of Related Art

With the development of optical imaging technology, camera modules are widely used in a variety of portable electronic devices, such as mobile phones, and personal digital assistants (PDAs).

Some portable electronic devices, for example, third generation (3G) mobile phones, include camera modules. The camera modules use actuators to provide zoom and auto-focus, such as, stepper motors. It is frequently necessary to use a gear assembly to transform the rotational movement of the actuators into linear movement. However, such gear assemblies generally increase the bulk of the camera modules. Furthermore, the occurrence of recoil in the gear assembly may degrade focusing accuracy.

Therefore, what is needed is a new motor and camera module using the new motor that can overcome the described limitations.

DETAILED DESCRIPTION

Embodiments will now be described in detail below with reference to drawings.

Figure 1:
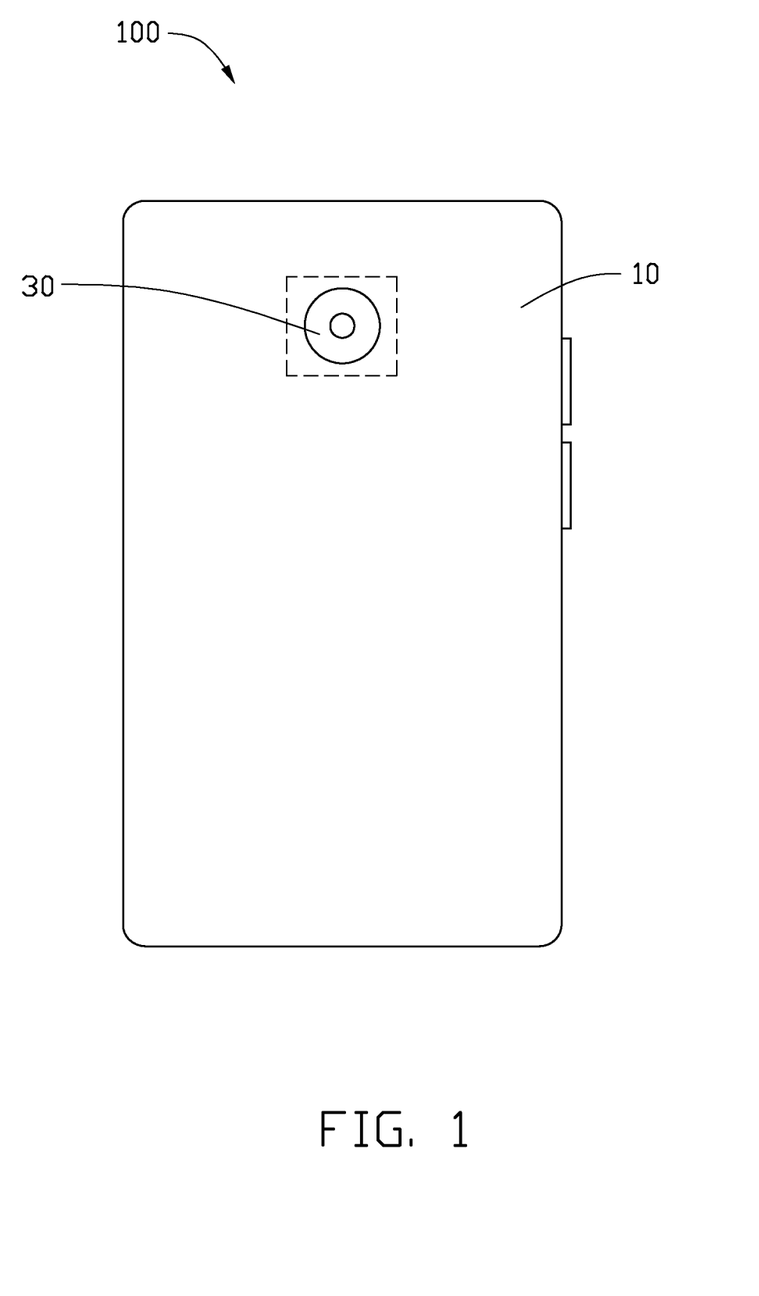
FIG. 1 is an isometric view of a portable electronic device according to an exemplary embodiment.

Referring to FIG. 1, a portable electric device 100, in accordance with an exemplary embodiment, is shown. The portable electric device 100 includes a main body 10, and a camera module 30 mounted on the main body 10.

Figure 2:
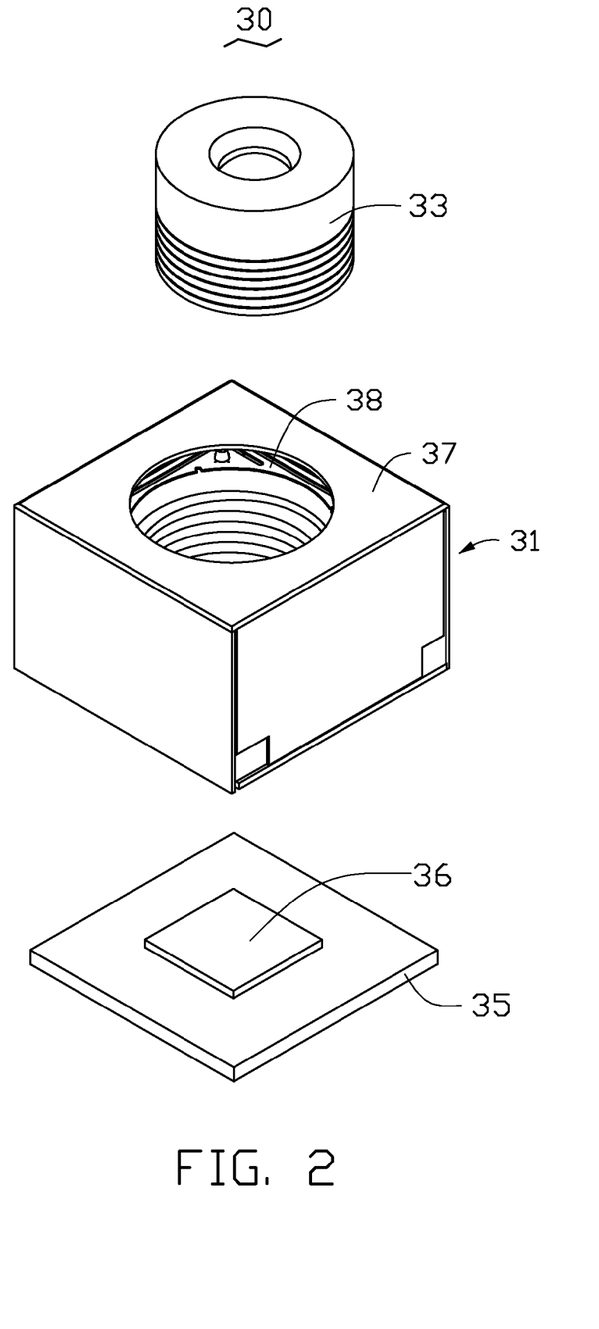
FIG. 2 is an exploded and isometric view of a camera module of the portable electronic device of FIG. 1.

Referring also to FIG. 2, the camera module 30 includes a voice coil motor 31, a lens barrel 33 receiving at least one lens (not shown) therein, a circuit board 35 mounted on the main body 10, and an image sensor 36 mounted on the circuit board 35.

The voice coil motor 31 includes a shell 37, and a drive module 38 received in the shell 37.

Figure 3:
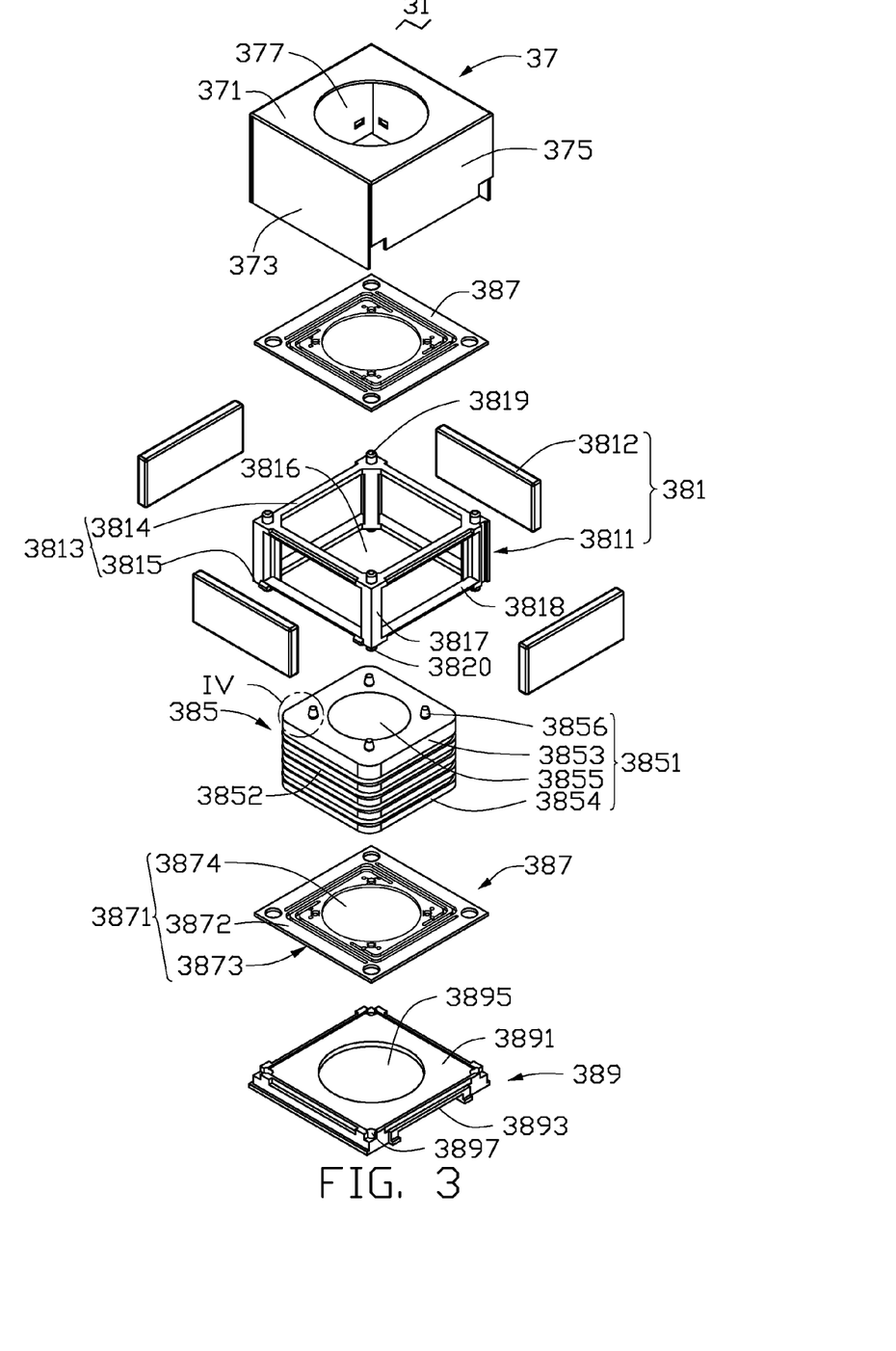
FIG. 3 is an exploded and isometric view of a voice coil motor of the camera module of FIG. 2.

The shell 37 is configured for protecting the lens barrel 33, the drive module 38, and the image sensor 36 from damage by impact. Referring also to FIG. 3, the shell 37 includes a top plate 371, two opposite first side plates 373, and two opposite second side plates 375. A through hole 377 is defined in the top plate 371, allowing light to pass therethrough. The top plate 371, the first side plates 373, and the second side plates 375 cooperatively define a receiving cavity (not labeled) for receiving the drive module 38 therein. The shell 37 is made of an electromagnetic shielding material, such as nickel alloy, conductive plastic, surface conductive material, or conductive glass.

The drive module 38 includes a fixed unit 381, a movable unit 385, two spring plates 387 arranged on two opposite ends of the movable unit 385, and a support base 389 for supporting the fixed unit 381.

The fixed unit 381 includes a fixed body 3811, and four magnets 3812 arranged on the fixed body 3811.

The fixed body 3811 includes a fixed frame 3813. The fixed frame 3813 includes an upper end 3814 and a lower end 3815 facing away from the upper end 3814. The fixed body 3811 defines a first receiving cavity 3816 passing through the upper end 3814 and the lower end 3815.

In the present embodiment, the fixed frame 3813 is substantially hollow cubic, and includes four sidewalls 3817 connected end to end, four first locating members 3819 arranged on the end surface of the upper end 3814, and four second locating members 3820 arranged on the end surface of the lower end 3815. Each sidewall 3817 defines a receiving cavity 3818. Each receiving cavity 3818 is configured for receiving a magnet 3812. Each cavity 3818 passes through a corresponding sidewall 3817, and communicates with the first receiving cavity 3816. The first locating members 3819 and the second locating members 3820 are locating posts.

In alternative embodiments, the fixed frame 3813 may be of other shapes, such as cylindrical, pentagonal, or prismatic. In further alternative embodiments, the receiving cavity 3818 may be replaced by a recess defined in the inner surface or outer surface of the sidewall 3817. In still further alternative embodiments, the first locating member 3823 may be other structures, such as a pin, or a recess.

The movable unit 385 is substantially cubic, and received in the first receiving cavity 3816. The movable unit 385 is configured for receiving the lens barrel 33 therein. The movable unit 385 includes a movable barrel 3851, and a coil 3852 arranged on the outer sidewall of the movable barrel 3851.

The movable barrel 3851 is movably received in the first receiving cavity 3816, and includes a top end 3853, a bottom end 3854 facing away from the top end 3853, four top locating members 3856 arranged on the end surface of the top end 3853, and four bottom locating members (not shown) arranged on the end surface of the bottom end 3854. The movable barrel 3851 defines a second receiving cavity 3855 passing through the top end 3853 and the bottom end 3854. In the present embodiment, the movable barrel 3851 is substantially a hollow cube. In alternative embodiments, the movable barrel 3851 may be other shapes, such as cylindrical, pentagonal, or prismatic.

Figure 4:
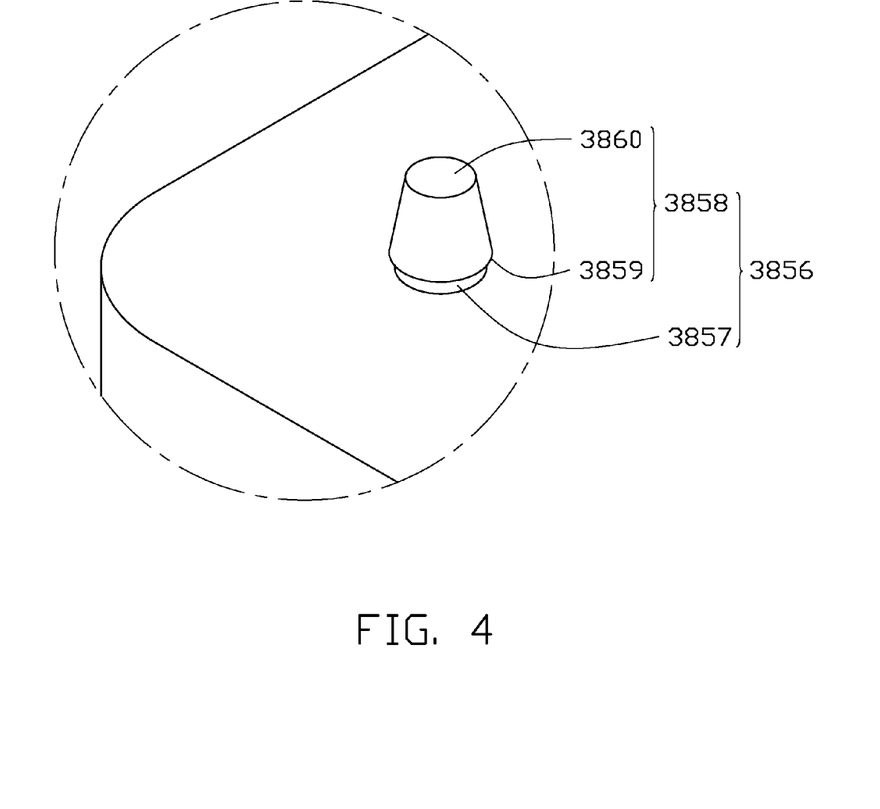
FIG. 4 is an enlarged isometric view of the circled portion IV illustrated in FIG. 3.

Referring also to FIG. 4, each of the top locating members 3856 includes a locating post 3857 protruding out from the end surface of the top end 3853, and a blocking portion 3858 arranged on the end of the locating post 3857 furthest from the top end 3853. In the present embodiment, the locating post 3857 is cylindrical-shaped, substantially perpendicular to the end surface of the top end 3853. In alternative embodiments, the locating post 3857 may be other shaped posts, such as triangular prisms, quadrangular prisms, or other prisms. In further alternative embodiments, the angle between the locating post 3857 and the end surface of the top end 3853 may be 45, 60, 75°, or other angle.

The blocking portion 3858 is a truncated cone, and includes a connecting end 3859 connected with the locating post 3857, and a distal end 3860 facing away from the connecting end 3859. The diameter of the blocking portion 3858 is gradually reduced from the connecting end 3859 to the distal end 3860. The orthogonal projections of the distal end 3860 and the locating post 3857 on the end surface of the top end 3853 are located in the orthogonal projection of the connecting end 3859 on the end surface of the top end 3853, thereby making the blocking portion 3858 prevent a inner frame 3876 (see FIG. 5) of the spring plate 387 from moving relative to the movable barrel 3851. In the present embodiment, the distance between the top end 3853 and the connecting end 3859 is equal to the thickness of each spring plate 387, thereby making the spring plate 387 tightly sandwiched between the top end 3853 and the blocking portion 3858.

The bottom locating members are identical to the top locating members 3856.

Figure 5:
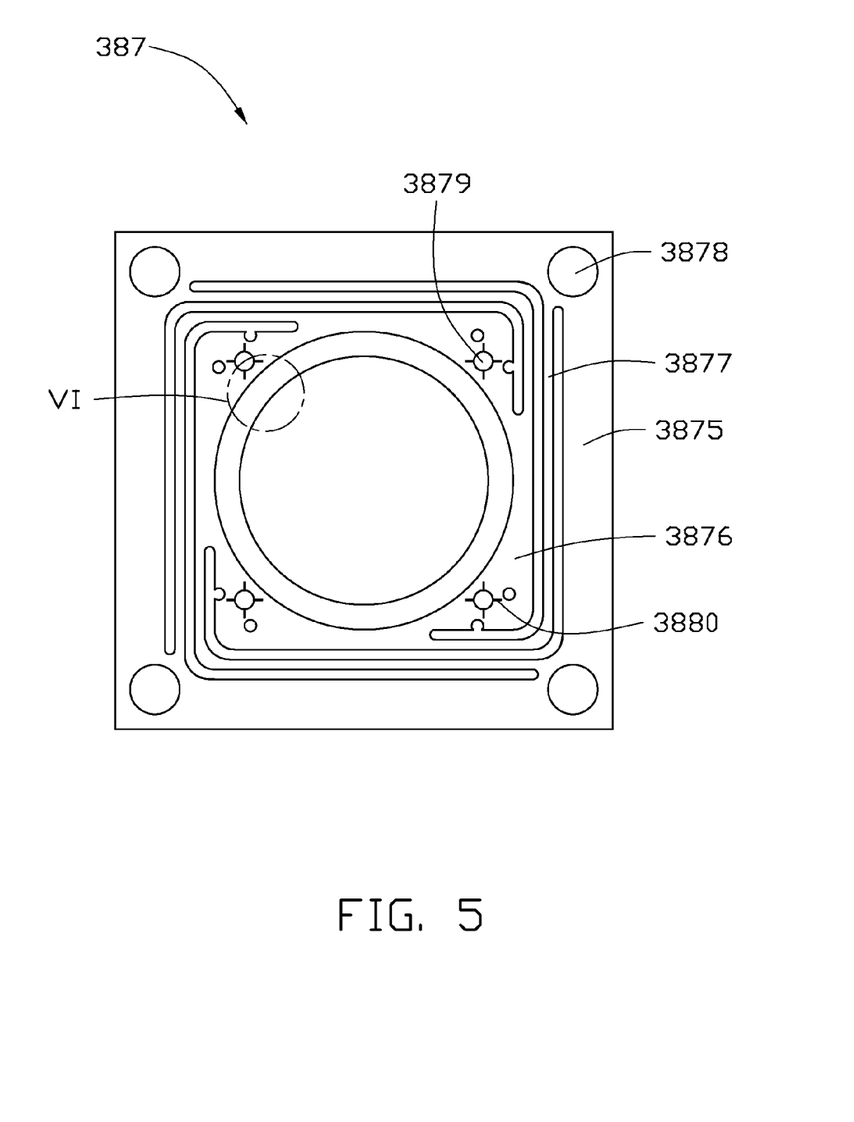
FIG. 5 is an isometric view of a spring plate of the voice coil motor of FIG. 3.
Figure 6:
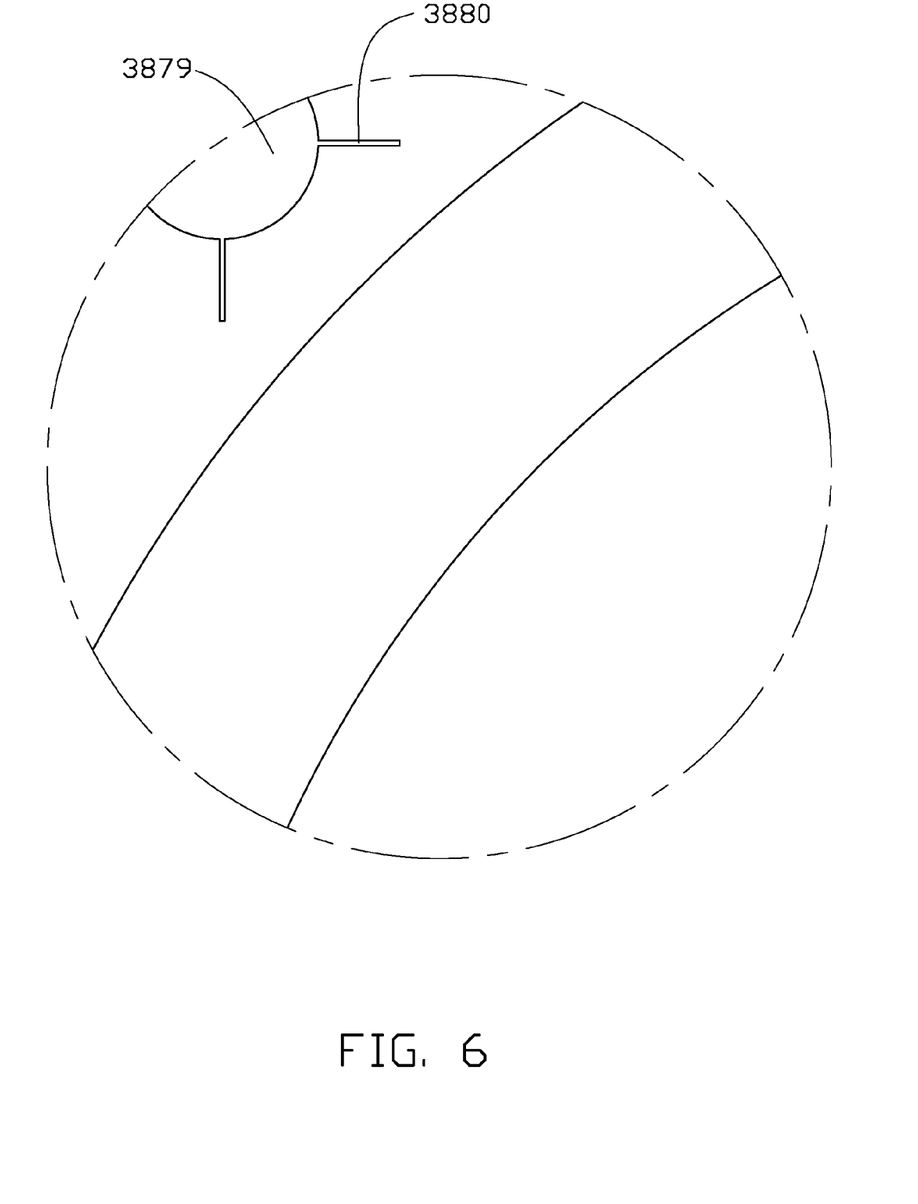
FIG. 6 is an enlarged, sectional view of the circled portion VI illustrated in FIG. 5.

Referring also to FIGS. 3, 5 and 6, each spring plate 387 includes a flat plate 3871. The flat plate 3871 includes a top surface 3872, a bottom surface 3873 facing away from the top surface 3872, an outer frame 3875, an inner frame 3876 surrounded by and coaxial with the outer frame 3875, and four spring arms 3877. The spring arms 3877 are positioned between the inner frame 3876 and the outer frame 3875, and surround the inner frame 3876. The flat plate 3871 defines a through hole 3874 in the inner frame 3876. The through hole 3874 passes through the top surface 3872 and the bottom surface 3873. The through hole 3874 is configured for allowing light to pass through the flat plate 3871. In other embodiments, there may be two, three, five or more spring arms.

The outer frame 3875 includes four first locating holes 3878 spatially corresponding to the respective first locating members 3819 or the respective second locating members 3820. The first locating holes 3878 receive the corresponding first locating members 3819 or the respective second locating members 3820 for securing the outer frame 3875 and the fixed frame 3813 together. In the present embodiment, the outer frame 3875 is a square frame. In other embodiments, the outer frame 3875 may be other shapes, such as round, triangle, or pentagon.

The inner frame 3876 includes four second locating holes 3879 spatially corresponding to the top locating members 3856 or the bottom locating members. The second locating holes 3879 receive the corresponding top locating members 3856 or the bottom locating members for securing the inner frame 3876 to the movable barrel 3851. A diameter of each second locating hole 3879 is less than that of each connecting end 3859.

Four spaced gaps 3880 are defined in the inner surface of each second locating hole 3879. Accordingly, when the top locating members 3856 or the bottom locating members pass through the corresponding second locating holes 3879, the second locating holes 3879 can slightly deform. Therefore, allowing for an easy assembly of the spring plates 387 and the movable barrel 3851. The four gaps 3880 of each second locating hole 3879 communicate with each other and pass through the top surface 3872 and the bottom surface 3873 of the flat plate 3871. In alternative embodiments, there may be one, two, three or more second locating holes 3879. In further embodiments, there may be one, two, three or more gaps 3880.

Figure 7:
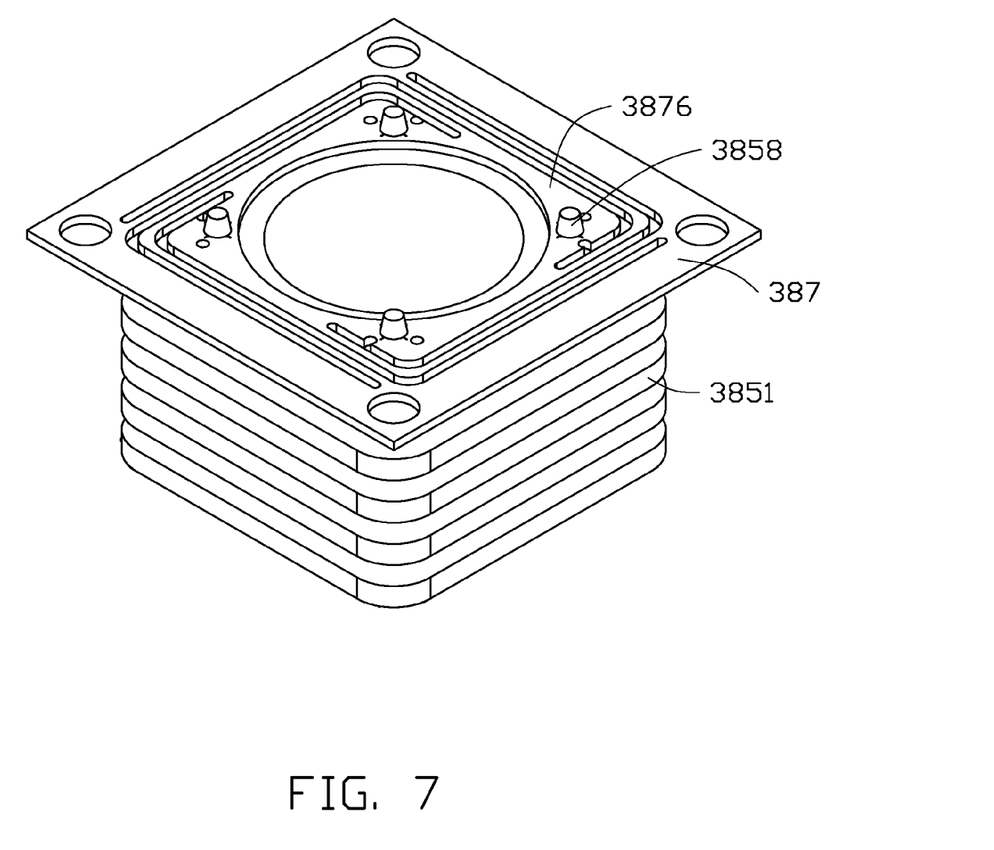
FIG. 7 is an assembled isometric view of the spring plate and a movable barrel of the voice coil motor of FIG. 3.

Referring also to FIG. 7, the second locating holes 3879 are engaged with the corresponding locating posts 3857, thereby locating the inner frame 3876 to the movable barrel 3851, and making the inner frame 3876 tightly sandwiched between the blocking portion 3858 and the end surface of the movable barrel 3851. Accordingly, adhesive between the inner frame 3876 and the movable barrel 3851 can be omitted, and connection stability between the inner frame 3876 and the movable 3851 can be improved.

The support base 389 (see FIG. 3) includes a top surface 3891, a bottom surface 3893 facing away from the top surface 3891, and four third locating members 3897 spatially corresponding to the second locating members 3820. The support base 389 defines a through hole 3895 passing through the top surface 3891 and the bottom surface 3893. The third locating members 3897 are engaged with the corresponding second locating members 3820 cooperating with the fixed frame 3813 and the support base 389 form a whole body. In the present embodiment, the third locating member 3897 is a through hole. In alternative embodiments, there may be one spring plate 387.

It is understood that the portable electric device 100 may be a digital camera, a video recorder, or other electric device.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A voice coil motor comprising:
  a movable barrel, the movable barrel comprising a top end, and at least two top locating members arranged on the top end, each of the at least two top locating members comprising a locating post protruding outwards from the top end, and a blocking portion on the locating post, and
  a spring plate, the spring plate comprising a top surface, a bottom surface facing away from the top surface, and an inner frame, the spring plate defining a through hole passing through the top surface and the bottom surface, the inner frame surrounding the through hole, the inner frame defining at least two locating holes, each locating hole receiving a corresponding locating post, the spring plate positioned between the blocking portions of the at least two top locating members and the top end, the blocking portions locking the inner frame to the movable barrel, the inner surface of at least one locating hole of the at least two locating holes defining at least two spaced gaps, each of the at least two gaps passing through the top surface and the bottom surface.

2. The voice coil motor of claim 1, wherein the blocking portion is a truncated cone.

3. The voice coil motor of claim 2, wherein each blocking portion comprises a connecting end connected with the locating post, and a distal end facing away from the connecting end, the orthogonal projections of the distal end and the locating post on the top end of the movable barrel are located in the orthogonal projection of the connecting end on the top end of the movable barrel.

4. The voice coil motor of claim 1, wherein the locating post is cylindrical-shaped.

5. The voice coil motor of claim 1, wherein the locating post is a quadrangular prism.

6. The voice coil motor of claim 1, wherein the locating post is perpendicular to the top end of the movable barrel.

7. The voice coil motor of claim 1, further comprising a shell receiving the movable barrel and the spring plate.

8. The voice coil motor of claim 1, further comprising a support base supporting the movable barrel.

9. A camera module comprising:
  a lens barrel, and
  a voice coil motor for driving the lens barrel to move, the voice coil motor comprising:
    a movable barrel, the movable barrel comprising a top end, a bottom end facing away from the top end, and at least two top locating members arranged on the top end, the movable barrel defining a receiving cavity passing through the top end and the bottom end, the receiving cavity receiving the lens barrel, each of the at least two top locating members comprising a locating post protruding outwards from the top end, and a blocking portion on the locating post, and a spring plate, the spring plate comprising a top surface, a bottom surface facing away from the top surface, and an inner frame, the spring plate defining a through hole passing through the top surface and the bottom surface, the inner frame surrounding the through hole, the inner frame defining at least two locating holes, each locating hole receiving a corresponding locating post, the spring plate positioned between the blocking portions of the at least two top locating members and the top end, the blocking portions locking the inner frame to the movable barrel, the inner surface of at least one locating hole of the at least two locating holes defining at least two spaced gaps, each of the at least two gaps passing through the top surface and the bottom surface.

10. The camera module of claim 9, wherein the blocking portion is a truncated cone.

11. The camera module of claim 10, wherein each blocking portion comprises a connecting end connected with the locating post, and a distal end facing away from the connecting end, the orthogonal projections of the distal end and the locating post on the top end of the movable barrel are located in the orthogonal projection of the connecting end on the top end of the movable barrel.

12. The camera module of claim 9, wherein the locating post is cylindrical-shaped.

13. The camera module of claim 9, wherein the locating post is a quadrangular prism.

14. The camera module of claim 9, wherein the locating post is perpendicular to the top end of the movable barrel.

15. The camera module of claim 9, wherein the voice coil motor further comprises a shell receiving the movable barrel and the spring plate.

16. The camera module of claim 9, wherein the voice coil motor further comprises a support base supporting the movable barrel.

17. A portable electric device, comprising:
a main body, and
a camera module mounted on the main body, the camera module comprising:
  a lens barrel, and
  a voice coil motor for driving the lens barrel to move, the voice coil motor comprising:
    a movable barrel, the movable barrel comprising a top end, a bottom end facing away from the top end, and at least two top locating members arranged on the top end, the movable barrel defining a receiving cavity passing through the top end and the bottom end, the receiving cavity receiving the lens barrel, each of the at least two top locating members comprising a locating post protruding outwards from the top end and a blocking portion on the locating post, and
    a spring plate, the spring plate comprising a top surface, a bottom surface facing away from the top surface, and an inner frame, the spring plate defining a through hole passing through the top surface and the bottom surface, the inner frame surrounding the through hole, the inner frame defining at least two locating holes, each locating hole receiving a corresponding locating post, the spring plate positioned between the blocking portions of the at least two top locating members and the top end, the blocking portions locking the inner frame to the movable barrel, the inner surface of at least one locating hole of the at least two locating holes defining at least two spaced gaps, each of the at least two gaps passing through the top surface and the bottom surface.

18. The portable electric device of claim 17, wherein the blocking portion is a truncated cone.

19. The portable electric device of claim 18, wherein the blocking portion comprises a connecting end connected with the locating post, and a distal end facing away from the connecting end, the orthogonal projections of the distal end and the locating post on the top end are located in the orthogonal projection of the connecting end on the top end of the movable barrel.

20. The portable electric device of claim 17, wherein the locating post is cylindrical-shaped.

* * * * *